June 16, 1959
O. BERN
2,890,910
WHEEL CONSTRUCTION
Filed Oct. 17, 1956
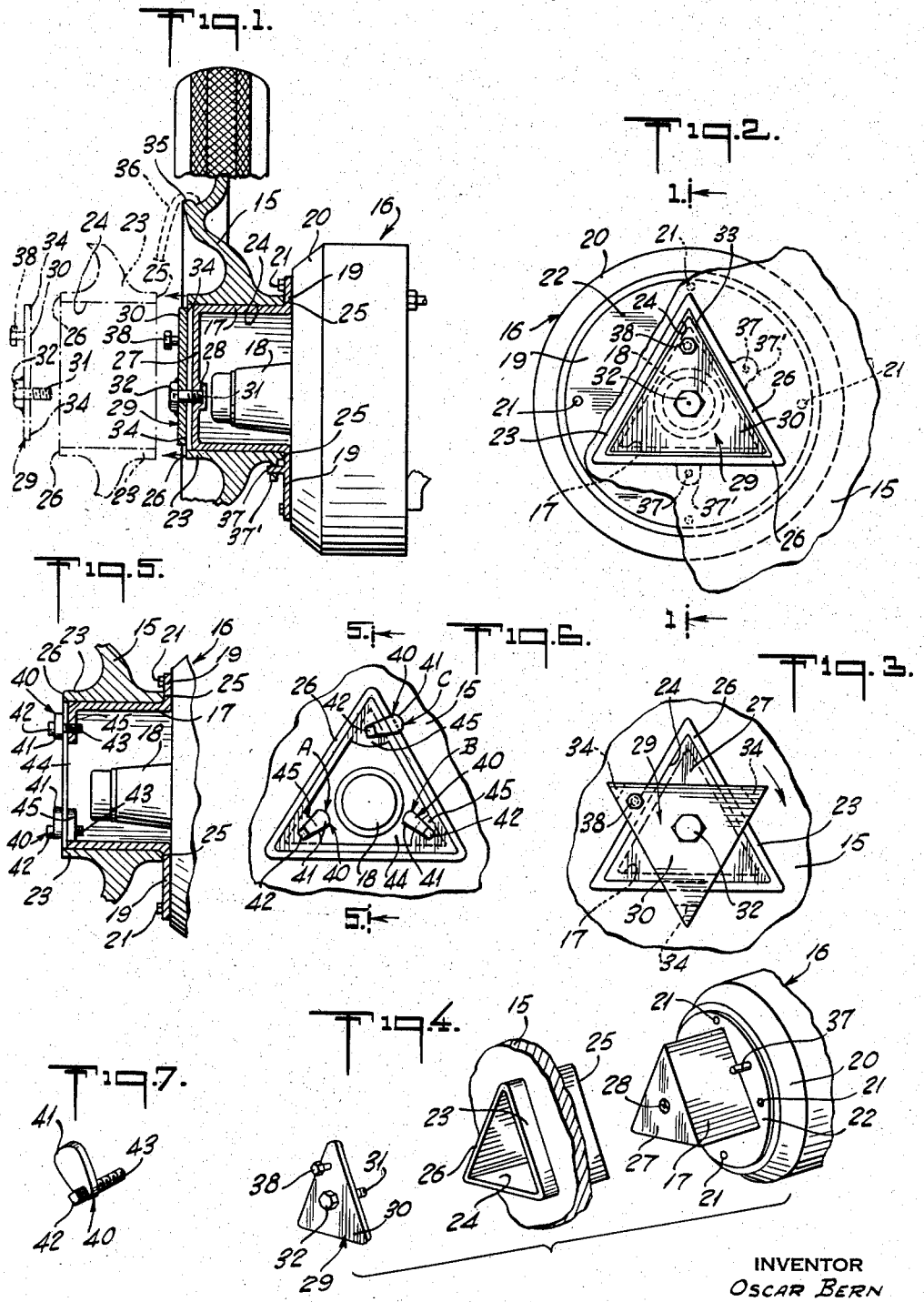
INVENTOR
OSCAR BERN
BY
Eugene S. Lovette
ATTORNEY United States Patent Office 2,890,910
Patented June 16, 1959

2,890,910

WHEEL CONSTRUCTION

Oscar Bern, New York, N.Y.

Application October 17, 1956, Serial No. 616,554

6 Claims. (Cl. 301—9)

This invention relates to improvements in automotive wheel construction.

Conventional automotive wheel structure incorporates five threaded lugs. It is universally understood that the five lugs must be completely removed from the wheel structure to attach or withdraw the tire supporting rim from the automobile. The entire automobile is supported by the five removable lugs holding each rim member to respective axle flanges or the brake drum structures. Not infrequently, automobile accidents occur by stripping of lug threads thus ultimately causing accidental wheel detachments. Occasionally, accidents occur by reason of faulty connection of the rim member to the axle or brake member because the mechanic mounting same does not properly attach or threadedly engage the lugs when making the connection. Carelessness of this sort is not infrequent.

The improvements of the instant invention contemplate a detachable tire supporting rim wherein the automobile is not supported by threaded lugs. Additionally, the improvements contemplate a novel structure for locking the rim member to the automobile, but without removable lugs to avoid the undesirable consequences attending wheel structures used to date.

The elimination of removable lug connections in a practical and safe design has been the goal of many to relieve car users of the inconvenience, annoyances and dangers attending flat tire changes. Many an automobile user has experienced the difficulty of attempting to align a relatively heavy rim member so that the lug apertures therein are properly aligned with the threaded holes in the wheel member in preparation for threading the lugs into the wheel member. Additionally, mislaid or careless loss of lugs while the tire is being changed has caused a great deal of aggravation and often required use of an automobile with mounted wheels with less than the proper number of lugs. Most women car users find tire changing too difficult or practically impossible because they are not able to align the rim to the wheel members for the purpose of preparing lug attachment. In addition, men, as well as women, often are never too sure whether the threaded lugs have been properly secured into the wheel after changing the flat tire.

It is the primary object of this invention to provide safe, improved and relative simple wheel structure for detachably securing the tire supporting rim to an automobile wheel member.

It is a further object of the instant invention to provide a detachable automobile wheel structure which does not rely upon removable threaded lugs to support the automobile to the tire supporting rim member as practiced to date.

It is a further object of the instant invention to provide automotive wheel structure which contemplates a novel wheel hub and rim collar engaging structure. In certain embodiments, a threaded lug or lugs serve no more than to ensure that the detachable rim is securely locked to the automobile wheel member. These structures eliminate the current use of removable threaded lugs to effect removal and attachment of rim structure to the automobile wheel member.

It is a further object of the instant invention to provide automotive wheel structure which contemplates a novel wheel hub and rim collar engaging structure for simplifying safe detachable automobile wheels relying in part upon truncated pyramidal or truncated cone engagements between the hub and collar.

It is a further object of the instant invention to provide automotive wheel structure which contemplates a novel wheel hub and rim collar engaging structure for simplifying safe, detachable automobile wheels relying in part upon a triangular cross-sectional or polygon cross-sectional slidable engagements between the hub outer surface and collar bore.

It is a further object of the instant invention to provide detachable tire supporting rim structure and accommodating automobile wheel member structure which are self-aligning thereby eliminating the cumbersome and difficult exertions required to mount a lug fastened wheel to the automobile as experienced to date.

It is a further object of the instant invention to simplify detachment and/or mounting of a detachable tire supporting rim to an automobile wheel member to render tire changing easier than experienced to date, which structure insures safer driving and which structure may be manufactured economically.

Other objects and advantages will become apparent from the following description taken in conjunction with the drawing in which:

Fig. 1 is a cut-out and sectional side elevation taken along lines 1—1 of Fig. 2 illustrating one embodiment of the invention and shows in solid lines a tire supporting rim member mounted to an automobile wheel member and also shows in dashed lines the rim member and locking nut detached from the wheel member;

Fig. 2 is a partly cut-out front elevation view showing locking nut orientation to allow slidable mounting or removal of the rim member from the wheel member;

Fig. 3 is a cut-out front elevation view showing the relative position of the locking nut in respect to the hub and rim collar when nut is in locked position;

Fig. 4 is an exploded perspective view of automobile structure incorporating the embodiment of the invention illustrated in Figs. 1 through 3;

Fig. 5 is a cut-out and sectional side elevation taken along lines 5—5 of Fig. 6 showing a modified embodiment of the invention in which three locking nuts are used in place of the single locking nut of the prior embodiment;

Fig. 6 is a cut-out front elevation of the embodiment shown in Fig. 5; and

Fig. 7 is a perspective view of the locking nut used in the embodiment illustrated in Figs. 5 and 6.

Figs. 1 through 4 illustrate an automobile wheel structure incorporating one embodiment of the instant invention. A tire supporting rim 15 is adapted to be detachably mounted to a turnable wheel member 16. Wheel member 16 may be a brake drum or an axle flange. Brake drum structure is illustrated herein. Wheel member 16 is provided with a hollow centrally disposed hub 17 made up of three outer walls disposed to form a triangularly shaped outer surface. Longitudinal edges joining the adjacent walls of hub 17 are preferably rounded. The underneath surface of the hub walls is hollowed to define a cavity for an axle spindle structure 18. At the rear, hub 17 has a radial flange 19. Hub 17 is rigidly fastened to the main part 20 of wheel member 16 by anchoring bolts 21 engaging radial rear flange 19. Surface 22 of flange 19 serves as the forward side of wheel member 16. Upon removal of anchoring bolts 21, hub 17 may be removed from brake drum structure to permit accessibility with axle spindle structure 18 encased in its housing. Pursuant to the object of the instant invention, hub 17 need not be removed from the brake drum structure for the purpose of changing tires; removal is necessary only when spindle structure 18 requires servicing.

Rim member 15 has a centrally disposed collar 23 provided with a triangularly shaped through bore 24 adapted to slidably fit over hub 17. Hub surface 17 and bore 24 are dimensioned to provide a snug slidable fit without play when rim member 15 is mounted on wheel member 16. The rear of rim member 15 terminates in a plane surface 25 adapted to abut against the surface 22 of wheel member 16 when rim member 15 is mounted thereon. The forward side of collar 23 is provided with an edge 26. Collar edge 26 lies in a relatively flat plane. The forward end of hub 17 terminates in a vertical surface 27 and has a threaded bore 28 therein.

In Fig. 1, the solid line illustration shows the relative position of rim member 15 when mounted on hub 17. The dashed line illustration shows the position of rim 15 in preparation to slidable mounting over hub 17. When rim 15 is mounted, surface 27 of hub 17 is slightly to the rear of collar edge 26.

A turnable locking nut 29 is provided with a triangular shaped flat plate 30. A threaded shank 31 extends longitudinally from rear side of plate 30 and is adapted to engage threaded bore 28. Locking nut 29 is also provided with a wrench head 32. Rim member 15 is rendered self-aligning by reason of the triangular shape of hub 17 and bore 24. Consequently, rim member 15 may be readily mounted on wheel member 16. This arrangement avoids the cumbersome and exasperating requirement of aligning lug apertures with threaded holes as currently practiced. It is exceedingly simpler to mount a triangular shaped bore structure to an accommodatingly shaped hub which provides self-aligning when mounting same. The triangular area of flat plate 30 is less than the triangular shaped cross-sectional area of bore 24 in the vertical plane of collar edge 26. This is evident from clearance 33 shown in Fig. 2. When the wheel is initially assembled, rim member 15 is mounted on hub 17. Locking nut 29 is then threaded to hub 17 until plate 30 is brought up close to collar edge 26 so that the bodies are aligned as shown in Fig. 2. It will be understood that in this position, locking nut 29 will require a further rotation of less than 120° to advance plate 30 so that it clamps against collar edge 26, as shown in Fig. 3. When plate 30 and collar 23 occupy the aligned positions illustrated in Fig. 2, rim member 15 may be slidably mounted on wheel member 16 or slidably removed therefrom. When plate 30 occupies the position shown in Fig. 2, it is presumed to be in close spaced relationship from collar edge 26, in which case nut 29 will probably require a small amount of rotation, such as 20° to 30°, to advance it from its position of Fig. 2 to its locking position shown in Fig. 3. Axial travel in the opposite direction returns nut 29 to the position of Fig. 2 to enable removal of rim member 15. Wrench head 32 is used to turn locking nut 29.

When bolt 38 bears firmly against collar edge 26, as shown in Fig. 3, rim member 15 is tightly wedged between nut 29 and surface 22 of wheel member 16. The edges along the rear side of plate 30 at 34 may be beveled to facilitate the tightening engagement against collar edge 26 upon locking rim member 15 to wheel member 16. It will be noted that locking nut 29 never need be removed from threaded engagement with hub 17. Nut 29 travels axially a short distance from its clearing position of Fig. 2 to its locking position of Fig. 3. Rim member 15 is provided with an annular inwardly turned ledge 35 engaged by an inwardly turned flange of a wheel hub cap 36. It is understood that threaded locking nut 29 will be provided with right-hand or left-hand threads depending upon the side of the automobile it is to be used. In the embodiment hereinbefore described, the automobile is supported entirely by the heavy structured hub rigidly attached to main portion 20 of wheel member 16 by anchoring lugs 21. This arrangement avoids the current practice of supporting the automobile by five removable lugs. The automobile support provided by hub 17 may be supplemented, if desired, by radially disposed studs 37 integrally a part of either rim member 15 or wheel member 16. For example, studs 37 project longitudinally and forwardly from the radial hub flange 19. Rim member 15 is provided with accommodating apertures to receive studs 37. Studs 37 register automatically with respective apertures therefor as a result of the self-aligning nature of a triangularly shaped hub 17 engaging a triangularly shaped bore 24. To facilitate register, studs 37 may be tapered with its outer end having the smaller diameter. The apertures therefor are correspondingly tapered. In addition, locking nut 29 may be modified to include, if desired, a stud 38 threaded to flat plate 30 of locking member 29, as shown in Figs. 1, 3 and 4. After rim member 15 is mounted to wheel member 16, threaded stud 38 may be advanced until it rests against the outer surface of rim collar and thus serves as a further locking agent. Threaded stud 38 would have to be withdrawn until it clears rim collar 23 before rim member 15 can be removed from wheel member 16.

The embodiments of Figs. 1 through 4 may be modified by use of a polygon cross-section or truncated pyramidal figure in lieu of the triangular shaped outer hub surface and collar bore. For a truncated pyramidal outer hub surface and collar bore slidable engagement, it is preferable that the forward end of the hub have the smaller diametered cross-section. In addition, the respective dimensions of the outer hub surface and collar bore of the truncated pyramidal design should be selected to provide a snug slidable fit when rim member 15 is mounted to wheel member 16. A snug slidable fit allows one to achieve a firmer attachment of rim member 15 to wheel member 16.

The embodiment of Figs. 5 through 7, inclusive, relies upon three similar locking nuts 40 to maintain rim member 15 secured to wheel member 16. Locking nuts 40 serve in lieu of the single locking nut 29 of the prior embodiment. Each nut 40 has an eccentric flat plate 41, a wrench head 42 on the forward surface thereof and a threaded shank 43 extending longitudinally from the rear surface thereof. Forward end face 44 of hub 17 is open except for three radial corner tongues 45 extending from the inner side walls of hub 17. Corner tongues 45 have threaded bores for engagement with respective nuts 40. The relatively large open end 44 of hub 17 provides accessibility to axle spindle 18 for servicing same. Eccentric flat plates 41 are pre-shaped such that the edges thereof do not overlap collar edge 26 when nuts 40 are oriented to assume the position shown at A or B of Fig. 6. In this position, eccentric flat plates 41 are axially forward of but in proximity to the plane collar edge 26 and are confined within the cross-section of forward end face 44 of hub 17. Further rearwardly axial travel of nuts 40 positions eccentric flat plates 41 to bear against collar edge 26 as illustrated by C in Fig. 6. When occupying position C, nuts 40 wedge rim member 15 firmly to wheel member 16. When nuts 40 are rotated in the opposite direction so that eccentric flat plates 41 clear collar edge 26, rim member 15 may be slidably removed from hub member 17 without any interference from protruding eccentric flat plates 41. Hereto it will be noted that locking nuts 40 need never be removed from threaded engagement with hub 17. Nuts 40 travel axially a short distance from clearing positions A or B to its locking position C.

Rim member 15 and wheel member 16 may be provided with studs 37 and corresponding stud apertures if desired. Additionally, outer hub surface and collar bore 24 configuration may be polygon cross-sectioned or shaped as a truncated cone or truncated pyramidal in lieu of the triangular shaped outer hub surface and collar bore as shown in Figs. 5 and 6.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Automobile wheel construction for mounting a detachable rim member to a vehicle wheel member comprising, a demountable tire supporting rim member provided with a collar having a triangular cross-sectional through bore extending along the axis of rotation, said rim member having a rear side plane surface, the edge surrounding said bore along the forward side of said collar being a relatively flat surface, a turnable automobile wheel member provided with a hub protruding outwardly along said axis of rotation from a relatively forward plane surface of said wheel member, said hub having a triangular shaped outer surface adapted to slidably register within said bore, said rim member being mounted to said wheel member by slidably mounting said bore over said hub until respective rear and forward surfaces of said members abut, the forward face of said hub terminating in a plane surface extending adjacent to but not projecting axially beyond the forward collar edge of said mounted rim member, said forward hub face having a threaded bore, and a turnable lock having a plate body and a threaded member extending axially from the rear surface thereof to engage said threaded bore, the surface area of said plate body being less than the area of said collar bore in its forward terminating plane, said plate body having a laterally extending edge adapted to overlap said forward collar edge for a particular angular orientation of said lock, said rim member being secured to said wheel member upon advancement of said lock until the plate thereof bears against said forward collar edge.

2. Automobile wheel construction for mounting a detachable rim member to a vehicle wheel member comprising, a demountable tire supporting rim member provided with a collar, said collar having a cross-sectional through bore of at least three sides extending along the axis of rotation, said rim member having a rear side plane surface, the edge surrounding said bore along the forward side of said collar being a relatively flat surface, a turnable automobile wheel member provided with a hub protruding outwardly along said axis of rotation from a relatively forward plane surface of said wheel member, said hub having an outer surface of at least three sides adapted to slidably register within said bore, said rim member being mounted to said wheel member by slidably mounting said bore over said hub until respective rear and forward surfaces of said members abut, the forward face of said hub being terminated in a plane surface extending adjacent to but not projecting axially beyond the forward collar edge of said mounted rim member, said forward hub face having a threaded bore, and a turnable lock having a plate body and a threaded member extending axially from the rear surface thereof to engage said threaded bore, the surface area of said plate body being less than the area of said collar bore in its forward terminating plane, said plate body having a laterally extending edge adapted to overlap said forward collar edge for a particular angular orientation of said lock, said rim member being secured to said wheel member upon advancement of said lock until the plate thereof bears against said forward collar edge.

3. Apparatus as defined in claim 2 further including, a threaded stud engaging a threaded hole disposed in said plate body whereupon inner axial travel of said stud causes said stud to abut against the outer surface of said collar when the plate is bearing against said collar.

4. Wheel construction for an automobile comprising, a demountable tire supporting rim member provided with a collar having a cross-sectional through bore of at least three sides disposed along the axis of rotation, said rim member terminating with a rear flat surface, a turnable hub member provided with a hub disposed along the axis of rotation and having an outer surface of the same number of sides as said bore extending axially from a relatively flat forward plane surface of said hub member, said outer hub surface being adapted to slidably register within said bore, said rim member being adapted for demountable attachment to said hub member by slidably inserting said hub into said bore until the respective rear and forward flat surfaces of said members abut, said collar having an edge surrounding said bore in the forward plane surface thereof, said hub extending axially to terminate at a forward surface adjacent to but not extending axially beyond said collar edge of the mounted rim member, tongues extending radially inwardly from the outer hub surface, said tongues having threaded holes, and a lock member having a threaded member extending axially for engagement with threaded holes of respective tongues and also having an eccentric extending transversely to the axis of travel of said lock member, said eccentric having a plane surface area less than the area of said hub terminating surface thereby being adapted to extend within confines of said outer hub surface for a particular orientation of said lock member, whereby axial travel of said bolt revolves same to cause the eccentric thereof to overlap and bear against adjacent forward collar edge and thereby locking said rim member to said hub member.

5. A wheel construction for an automobile comprising, a demountable tire supporting rim member provided with a collar having a tapered through bore disposed along the axis of rotation, said rim member terminating with a rear flat surface, a turnable hub member provided with a hub disposed along the axis of rotation and having a tapered outer surface extending axially from a relatively flat forward plane surface of said member, said outer hub surface being adapted to slidably register within said bore, said rim member being adapted for demountable attachment to said hub member by slidably mounting said hub into said bore until the respective rear and forward flat surfaces of said members abut, said collar having an edge surrounding said bore in the forward plane surface thereof, said hub extending axially and terminating in a forward surface adjacent to but not extending axially beyond said collar edge, said hub forward surface having a threaded bore, and a turnable lock having a plate body and a threaded member extending axially from the rear surface thereof to engage said threaded bore, the surface area of said plate being less than the area of said collar bore, said plate having a laterally extending edge adapted to overlap the forward collar edge for a particular orientation of said turnable lock member, said rim being locked to said hub member when the plate is advanced so that its lateral edges bear against said collar edge.

6. A wheel construction for an automobile comprising, a demountable tire supporting rim member provided with a collar having a through bore disposed along the axis of rotation, said rim member having a flat rear side surface, a turnable hub member provided with a hub disposed along the axis of rotation and having an outer surface extending axially from a relatively flat forward plane surface of said member, said outer hub surface being adapted to slidably register within said bore, said rim member being adapted for demountable attachment to said hub member by slidably mounting said hub into said bore until the respective rear and forward flat surfaces of said members abut, said collar having an edge surrounding said bore in the forward plane surface thereof, said hub extending axially and terminating in a forward surface adjacent to but not extending axially beyond said collar edge, said hub having a threaded bore in the plane normal to the axis of rotation and to the rear of said collar edge, and a turnable lock having a plate body and a threaded member extending axially from the rear surface thereof to engage said threaded bore, the surface area of said plate being less than the area of said collar bore, said plate having a laterally extending edge adapted to overlap the forward collar edge for a particular orientation of said turnable lock member, said rim being locked to said hub member when the plate is advanced until its lateral edges bear against said collar edge.

References Cited in the file of this patent
UNITED STATES PATENTS 2,093,191     Feldott _____ Sept. 14, 1937

FOREIGN PATENTS 160,503     Great Britain _____ Mar. 24, 1921